United States Patent [19]

Hemels et al.

[11] Patent Number: 5,130,072
[45] Date of Patent: Jul. 14, 1992

[54] PROCESS FOR THE PRODUCTION OF A MOLDED BODY COMPRISING PRESSED PARTICLES AND A PHENOLIC RESIN

[75] Inventors: Martin H. A. Hemels, Valkenswaard; Geert W. Schuren, Heel, both of Netherlands; Louis G. M. Driessen, Zolder, Belgium

[73] Assignee: Hoechst Aktiengesellschaft, Frankfurt am Main, Fed. Rep. of Germany

[21] Appl. No.: 537,982

[22] Filed: Jun. 13, 1990

[30] Foreign Application Priority Data

Jun. 16, 1989 [DE] Fed. Rep. of Germany ....... 3919756

[51] Int. Cl.⁵ .............................................. B29C 43/00
[52] U.S. Cl. .................................. 264/112; 156/62.2; 156/335; 264/120
[58] Field of Search ............... 264/109, 112, 113, 119, 264/120, 122; 528/129, 140, 147, 153; 156/335, 62.2

[56] References Cited

U.S. PATENT DOCUMENTS

| | | | |
|---|---|---|---|
| 2,986,546 | 5/1961 | Naps | 156/335 |
| 3,133,900 | 5/1964 | McDonald | 528/129 |
| 3,429,762 | 2/1969 | Nakagawa et al. | 156/335 |
| 4,044,087 | 8/1977 | Robitschek et al. | 264/113 |
| 4,195,019 | 3/1980 | Babina et al. | 260/17.25 |
| 4,244,906 | 1/1981 | Heinemann et al. | 264/109 |
| 4,337,334 | 6/1982 | Shimizu et al. | 528/129 |

FOREIGN PATENT DOCUMENTS

| | | | |
|---|---|---|---|
| 927041 | 5/1973 | Canada | 156/335 |
| 0254807 | 2/1988 | European Pat. Off. | 264/122 |
| 2949182 | 7/1980 | Fed. Rep. of Germany | 264/109 |
| 54-148823 | 11/1979 | Japan | 528/129 |
| 694389 | 11/1979 | U.S.S.R. | 264/122 |
| 1430343 | 3/1976 | United Kingdom . | |

OTHER PUBLICATIONS

Chemical Abstract, vol. 106, Nr. 18, p. 40, 1987, *Alkaline discoloration-resistant phenolic resin construction materials.*

*Primary Examiner*—Mary Lynn Theisen
*Attorney, Agent, or Firm*—Foley & Lardner

[57] ABSTRACT

In the process for the production of a molded body having a pressed core of solid inert particles which are coated with a thermoset phenolic resin, phenolic compounds on a basis of bisphenol, in particular a bis(hydroxyphenyl)alkane, and at least one compound which produces formaldehyde, and also a catalyst and optionally further additives customarily employed in the preparation of phenolic resins are mixed together with the inert particles. The mixture of particles obtained, preferably after precompressing and preforming, is pressed to form the molded body. During pressing under the action of heat formaldehyde is set free and the phenolic resin is completely cross-linked.

19 Claims, No Drawings

PROCESS FOR THE PRODUCTION OF A MOLDED BODY COMPRISING PRESSED PARTICLES AND A PHENOLIC RESIN

BACKGROUND OF THE INVENTION

The present invention relates to a process for the production of a molded body having a pressed core of solid inert particles which are coated with a thermoset phenolic resin.

A body of this kind is described for use as a decorative building panel in U.S. Pat. No. 4,503,115. The building panel comprises a pressed core of wood fibers which are coated with a thermoset phenol-formaldehyde resin. In the preparation of this molded body, the wood fibers are coated or impregnated with an aqueous alkaline solution of the thermosetting phenol-formaldehyde resin and the coated wood fibers are hot-pressed, the resin being cured in the process.

This method has various disadvantages. It is for example necessary for the solution of the phenol-formaldehyde resin to be prepared separately from the individual components, in a preceding stage. The solvent used for the still soluble phenol-formaldehyde resin must be removed from the wood fibers in a special process stage prior to pressing. This involves the risk that, together with the solvent, volatile low-molecular weight reaction products of phenol and formaldehyde and still unreacted phenol and formaldehyde also are removed. Consequently, an expensive purification of waste water and exhaust air is required. When hot-pressing the wood fibers there is furthermore a risk that the water formed as a result of the reaction of formaldehyde escapes abruptly and thus bursts the pressed body obtained.

SUMMARY OF THE INVENTION

It is therefore an object of the present invention to provide a process for the production of a molded body having a pressed core of solid inert particles which are coated with a thermoset phenolic resin which does not require a solution of a phenolformaldehyde resin to be prepared separately from the other components or a step of removing the solvent used for the phenol-formaldehyde resin. Another object is to provide a process which reduces the risk that the water formed as a result of the reaction of formaldehyde will burst the pressed body.

In accomplishing the foregoing objects there is provided according to the present invention a process for the production of a molded body having a pressed core of solid inert particles which are coated with a thermoset phenolic resin, comprising mixing the inert particles, at least one phenolic compound comprising a bis-phenol and at least one compound which produces formaldehyde upon decomposition, and subsequently hot-pressing the resultant mixture to form the molded body, wherein a completely cross-linked phenolic resin is produced by the heat.

In another embodiment of the present invention, the mixture is precompressed into a preform and then hot-pressed to form the molded body. During precompression, the phenolic compound may be precondensed with formaldehyde to produce a fusible oligomer.

There has also been provided according to the present invention a novel molded product produced according to the above-described process.

Further objects, features, and advantages of the present invention will become apparent from the detailed description of preferred embodiments that follows.

DETAILED DESCRIPTION OF THE PREFERRED EMBODIMENTS

According to the present invention, a molded body is produced by mixing inert particles in a dry state with a binder comprising solid particles of a bisphenol and at least one compound which produces formaldehyde, and also with a catalyst, i.e., an agent which catalytically accelerates curing and cross-linking, and optionally further additives customarily employed in the preparation of phenolic resins and the mixture obtained, preferably after precompressing and preforming, is pressed to form the molded body, complete curing and cross-linking of the bisphenol with formaldehyde into a water-insoluble, no longer fusible phenolic resin taking place during pressing under the action of heat.

According to the present process, the phenolic and cross-linking components of the binder used for the inert particles comprise substances which are substantially non-volatile at room temperatures, namely a bisphenol, and at least one compound which produces formaldehyde upon decomposition. The various components of the binder are mixed with the inert particles and react to form an insoluble, three-dimensionally cross-linked phenoplast resin, during pressing of the particles under the action of heat.

To accelerate curing and cross-linking of the phenolic resin, the preferably basic catalysts which are conventionally employed in the polycondensation of phenol with formaldehyde are employed in an effective amount. Preferred catalysts include calcium oxide, sodium hydroxide, lithium hydroxide, and potassium hydroxide. Further additives customarily used in the preparation of phenolic resins may be added, for example, flow agents, colored pigments, agents imparting hydrophobicity, release agents, flame retardants such as aluminum trihydrate, or additives to improve the thermal stability of the phenolic compounds.

The solid inert particles used for the production of the molded body do not react or react only to a minor degree with the binder and are not deformed, or deformed to an immaterial extent, under the pressure applied in the pressing process. The particles are, for example, comprised of wood, cellulose, plastics or an inorganic material, for example, stone powder or stone fibers and are hot-pressed together with the mixture of bisphenol and formaldehyde-producing compound. In a preferred embodiment the particles comprise wood fibers and/or cellulose fibers, in particular wood fibers containing about 0 to 40% by weight of cellulose fibers, relative to the total weight of the wood fibers. The wood fibers are prepared from types of wood which permit defibration. To prepare wood fibers, wood is broken up into wood chips in a mill, the wood chips obtained are softened in a few minutes using steam under a steam pressure of about 1 to 10 bars and then comminuted into wood fibers, for example, between two moving disks. Prior to mixing with the resin-forming components the resulting wood fibers preferably are dried to a water content of less than about 10%. The fibrous inert particles, in particular the wood fibers and cellulose fibers, have a length of about 0.3 to 20 mm, a mean length of about 0.5 to 3 mm and a mean diameter of about 0.025 to 0.05 mm. The diameter range is from about 0.01 to 1 mm.

In addition to, or in lieu of, wood fibers it is also possible to use particles containing coarser lignocellulose, such as wood shavings, wood flour, wood pulp or particles of other natural products, such as cotton, straw and the like, which are, for example, obtained as waste in industry or in wood-manufacturing shops. Furthermore, plastics particles, for example in the form of granules or fibers, can be used in addition to, or in lieu of wood particles. Cellulose particles are obtained by chemically digesting wood fibers, water-soluble fractions contained in the wood and the lignocellulose being removed in the process.

Bisphenols that may be used in the present invention are described in Ullmann, 4th edition, 18 page 215 et seq. Bisphenols comprise bis(hydroxyaryl)alkanes. Particularly preferred are bis(hydroxyphenyl)alkanes having 1 to 6, in particular 1 to 4, carbon atoms in the alkane chain. The hydroxyl group in the hydroxyphenyl radical is in the 2- and/or 4-position. The hydroxyphenyl radical may be substituted in the 3- and/or 5-position by one or two lower alkyl groups having in particular 1 to 3 carbon atoms. Cycloalkanes, in particular cyclohexanes, can also be used. Examples of these compounds are:

2,2'-bis(4-hydroxyphenyl)butane or -propane 2,2'-bis(3-methyl-4-hydroxyphenyl)butane or -propane These compounds are produced by condensing 1 mol of ketone, for example acetone or cyclohexanone, or an aldehyde, with 2 mols of phenol compounds which may be substituted by one or two lower alkyl groups.

The bisphenol is employed in a pure form or with the by-products and tarry reaction residues normally produced in the synthesis of bisphenol. These reaction residues include further phenolic compounds which react with formaldehyde to form non-fusible resins.

Substantially non-volatile by-products produced, for example in the reaction of acetone and phenol, comprise the isomeric bisphenol 2-(2-hydroxyphenyl)-2-(4-hydroxyphenyl)propane and the chroman derivatives represented by the structural formulae (a), (b) and (c)

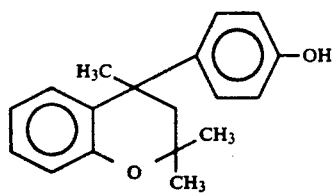
(a)

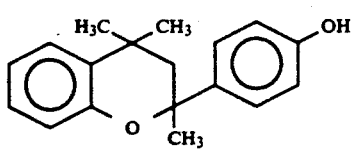
(b)

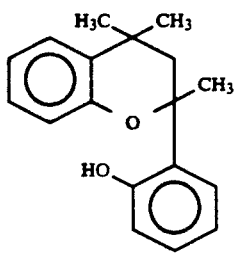
(c)

the indan derivatives illustrated by formulae (d) and (e)

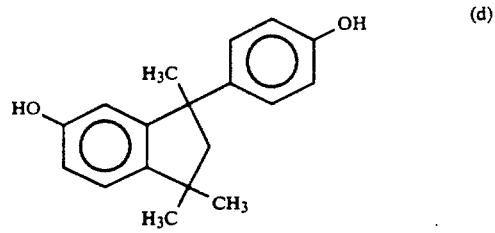
(d)

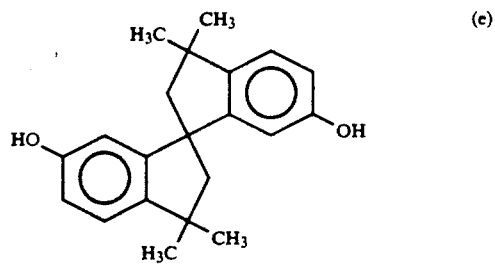
(e)

and the trisphenol having the formula (f)

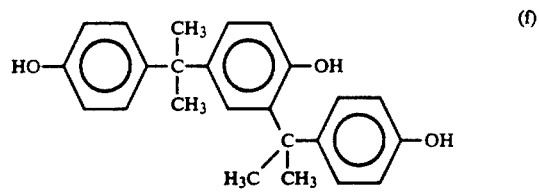
(f)

Further substantially non-volatile by-products included in the reaction residues of bisphenol preparation comprise small amounts of phenol polymers, aromatic solids, such as dimethylxanthene, and other tarry residues. A small amount of non-reacted phenol can also be present.

The bisphenol constituent in the total mixture of bisphenol and by-products is usually less than about 80% by weight, but can also be below about 50% by weight. Bisphenol A which is required for the preparation of certain polymers, such as polycarbonates, can even be removed to a large extent, i.e., down to about 20%, in particular down to about 30 to 40%, and the remaining bisphenol A can be used, together with the by-products, which are for example unusable for the preparation of polycarbonates, in particular with the tarry residue, as the phenolic component of the binder. For this purpose the residue is first coarsely crushed and then ground to the desired mean particle size. In general, bisphenol and the comminuted by-products of bisphenol preparation are employed at a mean particle size of 40 to 200 μm, in particular 60 to 150 μm.

Substances used in the present invention, which produce or release formaldehyde upon decomposition, decompose above 80° C., in particular above 100° C., which means that a reaction does not yet occur in the preparation of the mixture comprising inert particles and binder. Examples of such substances are paraformaldehyde, 1,3,5-trioxane (metaformaldehyde) and oxazolidines, for example 4,4-dimethyloxazolidine, but also solid or at least only slightly volatile compounds having methylol groups, which decompose at an elevated temperature according to the equation RCH₂OH- RH+HCHO. The particularly preferred compound which produces formaldehyde upon decomposition is hexamethylenetetramine. It is also possible to use a mixture of various formaldehyde-producing substances, which preferably decompose in different temperature ranges, for example paraformaldehyde and hexamethylenetetramine. In this way a stepwise curing and cross-linking can be attained. The ratio of the total weight of bisphenol or of bisphenol and by-products of bisphenol synthesis which may be present to the weight of the substances which produce formaldehyde is preferably 1:0.1 to 1:6, in particular 1:0.2 to 1:1, and more especially 1:0.2 to 1:0.8.

The bisphenol and the by-products obtained in the preparation of bisphenol, which may be present, and also the preferred formaldehyde-producing compounds do not contain water or other solvents. After mixing this binder with the inert particles, a drying process for removing water or other solvents of any kind is not required.

The binder components which are mixed with the inert particles and which comprise bisphenol, the substantially non-volatile by-products of bisphenol preparation which additionally may be present and the formaldehyde-producing compound are generally used in an amount of about 15 to 90% by weight, in particular about 20 to 60% by weight, relative to the weight of the inert particles employed.

The mixture of binder and inert particles is, for example, prepared in a kneading machine or in a mill, if further comminution of the binder particles and/or the inert particles is necessary. The binder components are mixed with the inert particles at a temperature at which the formaldehyde-producing compound is not yet decomposed and, consequently, no precondensation occurs. This temperature is normally below 100° C., and is in particular between 15° and 35° C.

For pressing this mixture to form a planiform molded body, planiform preforms which have been precompressed and preformed in a preliminary stage are preferably used because these permit easier handling. To prepare these preforms the mixture of binder components and inert particles obtained is, for example, introduced into a press or into a deep-drawing unit and is prepressed or deepdrawn under a pressure of about 10 to 50 bars, in particular about 20 to 40 bars, and at a temperature of about 10° to 80° C., in particular about 20° to 50° C., to produce precompressed preforms in the form of plates, slabs or sheets. In the preparation of the preforms it is also possible to maintain a higher temperature, at which the compound which produces formaldehyde is decomposed and reaction occurs between bisphenol and formaldehyde. If paraformaldehyde is used, this temperature is, for example, about 80° to 160° C., in particular about 90° to 120° C. To effect this reaction, known as precondensation, a basic catalyst is present. Partly condensed, still fusible oligomers comprising linear chain molecules are thereby produced, which contain methylol groups and are thus self-cross-linking in the following hot-pressing of the preforms.

The mixture of the still uncondensed binder components and the inert particles or the precompressed preforms, in which the binder may have been precondensed, are then hot-pressed, with three-dimensional cross-linking of the phenolic components taking place in the process, to form the desired molded bodies, for example in the form of plates, boards, beams, bars, pipes or housings. The phenolic resin obtained during this hot-pressing process from the reaction of the phenolic components with formaldehyde is substantially cured. It is no longer fusible and is consequently in the C-stage. If a precondensation has been carried out, a second formaldehyde-producing compound can, if desired be used. The mixture of compounds employed in this embodiment comprises a formaldehyde-producing compound which is decomposed at a relatively low temperature during precondensation and another compound which produces formaldehyde only during hot-pressing at a higher temperature. An example of a compound preferable for use in precondensation is paraformaldehyde. The second compound comprises, for example, hexamethylenetetramine which decomposes at temperatures above about 160° C. and releases formaldehyde. The temperature during hot-pressing is, in general, chosen in such a way that the resin is practically completely cured. Usually, the temperature is at least about 120° C., preferably about 130° to 250 C., in particular about 140° to 200° C.

The preferred pressing power is in the range from about 5 to 100 bars, in particular about 20 to 80 bars. Compared with the prior art, the pressing power is low, since no water is separated in the curing process. The pressing time is a function of the thickness of the molded body and the temperature and is, in general, 5 to 30 minutes. If preforms including precondensed resin are used, pressing time is reduced accordingly.

The pressing appliances employed can comprise deep-drawing units, continuously operating rolls or plate presses operating in fixed cycles. These pressing appliances have a smooth or structured pressing surface and serve for the production of flat plates or they possess a profile-type pressing surface and are used for the production of plates with a profile-type shape, for example, in the form of angles or corrugated plates.

The molded body obtained in accordance with the process of the present invention is a plate or sheet of large surface area in proportion to its thickness, whose surface form is adapted to the intended application and which has, for example, an angular, curved or planar shape. The molded body is, in particular, a plate-shaped body having a substantially plane surface. However, it is also possible to prepare bodies in the form of profiles, bars or tubes.

The completed, preferably plate-shaped, sheet-shaped or profile-shaped molded body has the above-indicated amount of binder of about 15 to 90% by weight, and a density of about 600 to 1450 kg/m$^3$, if wood and/or cellulose particles are used. In the form of a plate or sheet it has a thickness of about 0.5 to 100 mm, preferably about 2 to 40 mm and in particular about 2 to 20 mm. The thickness of the preforms is adjusted prior to the final pressing operation, depending on the desired thickness of the molded bodies.

It is also possible to cover one or both surfaces of a preform, prior to pressing, with a decorative layer comprising a decorative sheet of a woven fabric, a non-woven or a plastics, paper or wooden sheet, the decorative sheet having already been impregnated with a thermosetting resin, in particular a melamine-formaldehyde resin. Preferably, the decorative sheet has a weight per unit area of about 80 to 400 g/m$^2$, particularly about 120 to 300 g/m$^2$. The precompressed particle mixture of the preform is then hot-pressed together with the decorative layer under the above-specified conditions, to form a decorative molded body, especially a decorative plate.

Decorative layers can also be applied after the final pressing operation, by laminating appropriate surface layers to the molded body. A decorative surface can subsequently be produced, also by applying a varnish coat to the molded body.

To prepare scratch-resistant and, if necessary, particularly weather-resistant surfaces, resins which are cross-linkable by means of electron beams, in particular cross-linkable aliphatic polyurethane resins or polyester resins, are applied to the surface of the pressed molded body and then cross-linked. The resin layer obtained is optionally subjected to a pressure treatment. In order to enhance the decorative effect, these resin layers also may contain fillers or colored pigments. The preparation of surface layers of this kind is described in EP-A-0 166 153 and EP-A-0 216 269. The decorative plates described in these two documents can also be used as a surface layer for a sheet-shaped or plate-shaped molded body according to the present invention.

The present invention is illustrated further by the examples below. The following properties were determined: the bending strength according to DIN 53 452, the modulus of elasticity according to DIN 53 457, the density according to DIN 53 479, the absorption of water and the swelling of edges according to DIN 53 799.

EXAMPLE 1

456 g of particles comprising bisphenol A are homogeneously mixed at 20° to 100° C. with 186 g of particulate hexamethylenetetramine, 3.46 g of a CaO catalyst and 2,000 g of dry wood fibers. The mixture is uniformly spread on a pressing plate and then pressed for 8 minutes in a heated press (180° C.) under a pressure of 80 bars. The plate obtained is removed from the press in the still-hot state. The plate has a thickness of 7 mm and the following properties:

| | |
|---|---|
| bending strength | 127 N/mm² |
| modulus of elasticity | 11,000 N/mm² |
| density | 1,370 kg/m³ |
| absorption of water | 2.5% |
| | (boiling for 2 hours) |
| swelling of edges | 6 0% |
| | (boiling for 2 hours) |

EXAMPLE 2

822 g of a finely ground reaction residue resulting from the preparation of bisphenol A by reacting acetone and phenol, having the following composition:

| | |
|---|---|
| 30 | parts by weight of bisphenol A |
| 16 | parts by weight of 2-(2-hydroxyphenyl)-2-(4-hydroxyphenyl)propane |
| 20 | parts by weight of chroman derivatives |
| 22.5 | parts by weight of indan derivatives |
| 7.5 | parts by weight of trisphenol |
| 8 | parts by weight of other phenol polymers is mixed with |
| 4.8 | g of a NaOH catalyst |
| 376 | g of hexamethylenetetramine and |
| 2,000 | g of wood fibers | at 20° to 100° C., spread into a plate mold and thereafter passed for 16 minutes in a press (160° C.) under a pressure of 20 bars. The plate obtained is 6 mm thick.

| Plate properties: | |
|---|---|
| bending strength | 80 N/mm² |

| -continued | |
|---|---|
| Plate properties: | |
| modulus of elasticity | 7,800 N/mm² |
| density | 1,100 kg/m³ |
| absorption of water | 3.5% |
| | (boiling for 2 hours) |
| swelling of edges | 5.0% |
| | (boiling for 2 hours). |

EXAMPLE 3

The mixture of binder and wood fibers described in Example 1 is preformed and precompressed into plate-shaped preforms. A decorative paper impregnated with a melamine resin is applied to both surfaces of the preforms which are then pressed under the conditions of Example 1. The plate thickness is 7.2 mm.

| Plate properties: | |
|---|---|
| bending strength | 140 N/mm² |
| modulus of elasticity | 14,000 N/mm² |
| density | 1,350 kg/m³ |
| absorption of water | 1.3% |
| | (boiling for 2 hours) |
| swelling of edges | 3.0% |
| | (boiling for 2 hours). |

EXAMPLE 4

The mixture of binder and wood fibers described in Example 2 is preformed and precompressed into plate-shaped preforms. Prior to pressing, a decorative paper which has been printed and impregnated with a melamine resin is applied to one surface of the preforms which are then pressed under the same pressing conditions as in Example 2. On the side forming the outside surface of the plate the decorative paper has a transparent layer comprising a synthetic resin polymerized by means of electron beams. A decorative paper provided with this clear layer is described in Example 1 of EP-A0 166 153. The plate obtained is 6.1 mm thick and has the following properties:

| | |
|---|---|
| bending strength | 100 N/mm² |
| modulus of elasticity | 8,300 N/mm² |
| density | 1,120 kg/m³ |
| absorption of water | 2.5% |
| | (boiling for 2 hours) |
| swelling of edges | 3.0% |
| | (boiling for 2 hours). |

EXAMPLE 5

A plate is prepared as in Example 4. However, in this case the decorative paper is not printed and comprises two superposed layers of a radiation-polymerized synthetic resin, the outer layer being a clear layer and the intermediate layer containing colored pigments. The wood fiber mat described in Example 4 of EP-A-0 166 153, for example, shows such a surface. The plate has the same properties as the plate prepared according to Example 4.

EXAMPLE 6

By adding 16% by weight of mono-diammonium-phosphate and 5% by weight of aluminumhydrate powder to the mixture described in Example 2 comprising binder and wood fibers (=100% by weight) a flameresistant plate according to DIN 4102 is produced, which has otherwise unchanged properties.

EXAMPLE 7

A mixture comprising 1,000 g of a finely ground tarry reaction residue resulting from the preparation of bisphenol A by reacting acetone with phenol, having the following composition:

| |
|---|
| 10 parts by weight of bisphenol A |
| 1 part by weight of 2-(2-hydroxyphenyl)-2-(4-hydroxyphenyl)propane |
| 30 parts by weight of chroman derivatives |
| 30 parts by weight of indan derivatives |
| 5 parts by weight of spirobisindan |
| 5 parts by weight of trisphenol |
| 7 parts by weight of dimethylxanthene |
| 12 parts by weight of di- and trimers of phenol |
| and |
| is mixed with |
| 12 g of a sodium hydroxide as a catalyst |
| 90 g of hexamethylenetetramine and |
| 2,100 g of wood fibers | and precompressed into plate-shaped preforms at about 15° to 35° C. and under a pressure of about 2 bars, without precondensation occurring in the process. An underlying paper impregnated with a phenolic resin and a decorative paper impregnated with a melamine resin are applied to both surfaces of the preforms which are then pressed for 8 minutes at 180° C. and under a pressure of 50 bars. The decorative plate obtained has good mechanical properties and possesses a decorative surface which meets the requirements according to DIN 53 799.

What is claimed is:

1. A process for the production of a molded body having a pressed core of solid inert particles which are coated with a thermoset phenolic resin comprising the steps of:
   (a) mixing said inert particles, at least one phenolic compound comprising a bis-phenol and at least one compound which produces formaldehyde upon decomposition,
   (b) precompressing the resultant mixture into preforms, wherein during the precompressing the said at least one phenolic compound is precondensed with formaldehyde to produce a fusible oligomer, and subsequently
   (c) hot-pressing the resultant preform to form said molded body, wherein a completely cross-linked phenolic resin is produced by the heat.

2. A process as recited in claim 1, wherein said at least one phenolic compound comprises bisphenol and further by-products obtained in the preparation of bisphenol.

3. A process as recited in claim 2, wherein said at least one phenolic compound comprises bis(hydroxyphenyl)alkane and further by-products obtained in the preparation of bis(hydroxyphenyl)alkane.

4. A process as recited in claim 3, wherein said at least one phenolic compound comprises 2,2'-bis(4-hydroxyphenyl)propane and the by-products produced in the condensation of phenol and acetone into 2,2'-bis(4hydroxyphenyl)propane.

5. A process as recited in claim 1, wherein the amount of said at least one phenolic compound and said at least one compound which produces formaldehyde is about 15 to 90% by weight, relative to the weight of said inert particles.

6. A process as recited in claim 1, wherein the at least one compound which produces formaldehyde comprises at least one compound selected from the group consisting of hexamethylenetetramine, paraformaldehyde, metaformaldehyde and oxazolidines.

7. A process as recited in claim 1, wherein said at least one compound which produces formaldehyde comprises a mixture of compounds which decompose, respectively, at a first and second temperature ranges to produce formaldehyde.

8. A process as recited in claim 7, wherein said precompressing step is carried out in said first temperature range, and said hot-pressing step is carried out in said second temperature range.

9. A process as recited in claim 3, wherein the bis(hydroxyphenyl)alkane includes a straight-chain alkane radical having 1 to 6 carbon atoms.

10. A process as recited in claim 4, wherein the bis(hydroxyphenyl)alkane includes a straight-chain alkane radical having 1 to 4 carbon atoms.

11. A process as recited in claim 3, wherein the bis(hydroxyphenyl)alkane includes a cycloalkane radical.

12. A process as recited in claim 2, wherein the ratio of the total weight of bisphenol and the bisphenol preparation by-products to the weight of the formaldehyde-producing compound is from about 1:0.1 to 1:6.

13. A process as recited in claim 12, wherein the ratio of the total weight of bisphenol and the bisphenol preparation by-products to the weight of the formaldehyde-producing compound is from about 1:0.2 to 1:1.

14. A process as recited in claim 1, further comprising applying a decorative layer to at least one surface of the preform.

15. A process as recited in claim 1, further comprising adding during step (a) at least one catalyst selected from the group consisting of calcium oxide, sodium hydroxide, lithium hydroxide and potassium hydroxide.

16. A process as recited in claim 1, further comprising adding during step (a) at least one ingredient selected from the group consisting of a flow agent, a colored pigment, an agent imparting hydrophobicity, a release agent, a flame retardant and a phenolic compound thermal-stabilizing agent.

17. A process as recited in claim 1, wherein said inert particles are selected from at least one of the group consisting of wood, cellulose, plastic, and stone powder.

18. A process as recited in claim 17, wherein said inert particles consist of wood fibers, cellulose fibers, or a mixture thereof.

19. A process for the production of a molded body having a pressed core of solid inert particles which are coated with thermoset phenolic resin consisting essentially of:
   (a) mixing said inert particles, at least one phenolic compound comprising a bis-phenol and at least one compound which produces formaldehyde upon decomposition,
   (b) precompressing the resultant mixture into preforms, wherein during the precompressing the said at least one phenolic compound is precondensed with formaldehyde to produce a fusible oligomer, and subsequently
   (c) hot-pressing the resultant preform to form said molded body, wherein a completely cross-linked phenolic resin is produced by the heat.

* * * * *